United States Patent [19]

Merle et al.

[11] Patent Number: 5,430,290
[45] Date of Patent: Jul. 4, 1995

[54] PHOTOSENSITIVE ELEMENT AND DETECTOR FOR DETECTING FLASHES OF LIGHT

[75] Inventors: Jean-Pierre Merle, Orsay; Francis Devos, La Ville Du Bois, both of France

[73] Assignee: Societe Nationale Industrielle et Aerospatiale, Paris, France

[21] Appl. No.: 266,715

[22] Filed: Jun. 28, 1994

[30] Foreign Application Priority Data

Jul. 5, 1993 [FR] France ................... 93-08203

[51] Int. Cl.[6] ............................................. H01J 40/14
[52] U.S. Cl. ................................ 250/208.1; 348/149
[58] Field of Search .................... 356/5, 4; 348/149; 250/208.1, 214 VT, 201.4, 561

[56] References Cited

U.S. PATENT DOCUMENTS

| | | | |
|---|---|---|---|
| 3,446,972 | 5/1969 | Bentley et al. | 250/207 |
| 4,293,877 | 10/1981 | Tsunekawa et al. | 348/316 |
| 5,216,259 | 6/1993 | Stern et al. | 250/561 |

FOREIGN PATENT DOCUMENTS

| | | |
|---|---|---|
| 0075767 | 4/1983 | European Pat. Off. |
| 0519105 | 12/1992 | European Pat. Off. |
| 2583523 | 12/1986 | France |
| 3429943 | 5/1985 | Germany |

OTHER PUBLICATIONS

Patent Abstracts Of Japan, vol. 7, No. 130, (p.-202), (1275), Jun. 2, 1983.

*Primary Examiner*—David C. Nelms
*Assistant Examiner*—Jacqueline M. Steady
*Attorney, Agent, or Firm*—Fisher, Christen & Sabol

[57] ABSTRACT

The present invention relates to a photosensitive element (1) for detecting flashes of light (2).

According to the invention, said photosensitive element (1) includes a control device (4) knowing the instant of the emission of the flashes of light (2) and capable of switching said photosensitive element into one or the other of two different states:

a positive accumulation state in which the accumulation capacitor (12) is charged by the light energy from said photosensitive element (1); and a negative accumulation state in which the accumulation capacitor (12) is discharged by the light energy from said photosensitive element (1).

12 Claims, 4 Drawing Sheets

PHOTOSENSITIVE ELEMENT AND DETECTOR FOR DETECTING FLASHES OF LIGHT

The present invention relates to a photosensitive element for detecting flashes of light, as well as to a detector including a plurality of such photosensitive elements. It also relates to devices, equipped with such detectors, for location and analysis of light sources.

Devices are already known for detecting light sources, including a plurality of photosensitive elements capable of generating signals characteristic of a light source, upon detection of such a source.

The major drawback of the use of such devices stems from the presence, in addition to the light flashes emitted by a source which it is desired to detect, of numerous beams and flashes of light which form a light background noise and which also illuminate said devices.

This background noise often makes it very difficult to detect the flashes of light sought.

It may even happen that the noise is so great that it almost entirely covers the light signal which it is desired to detect.

It will be noted that the document FR-A-2, 583, 523, which discloses a system including photosensitive elements arranged in rows and columns in matrix form, for locating a mobile unit emitting flashes of light, makes provision, in order to overcome this drawback, to associate a comparison device with said system. This comparison device makes it possible to record the background noise, either just before or just after the detection, and to subtract this recorded background noise from the detected signal containing the flashes of light sought.

However, the detection frequency is reduced for this system. In fact, each detection duration requires an identical duration for the recording of the background noise which is to be subtracted, and the subtraction time is lengthy, since this subtraction is not integrated into the detection and it is performed only after the reading of the images.

Moreover, from the document DE-A-34 29 943, a photosensitive element is known, for detecting flashes of light, including an accumulation capacitor, a photosensitive diode capable of converting the light energy into electric current, and a control device knowing the instant of the emission of the flashes of light and capable of switching said photosensitive element into one or the other of two different states:

- a positive accumulation state, activated at least over the duration of emission of the flashes of light, in which state the accumulation capacitor is charged by the electric current generated by the light energy reaching said photosensitive element; and
- a negative accumulation state, in which the accumulation capacitor is discharged by the electric current generated by the light energy reaching said photosensitive element.

Thus, this known photosensitive element is capable either of integrating the light signals which illuminate it and, in particular, the flashes of light which it is desired to detect, or to subtract these light signals, depending on the state into which it is switched.

However, this known photosensitive element exhibits the drawback of requiring a complex control device.

The object of the present invention is to make it possible to produce a photosensitive element of this type, provided with a simple control device.

To this end, according to the invention, the photosensitive element of the type described above is characterized which includes a second photosensitive diode and a switching system, controlled by said control device and capable of linking the accumulation capacitor, on the one hand, to one of said photosensitive diodes in the positive accumulation state and, on the other hand, to the other of said photosensitive diodes in the negative accumulation state.

Thus, the positive accumulation and negative accumulation states are obtained by two different ways of connecting the two photosensitive diodes with respect to the accumulation capacitor. Topologically, said photosensitive diodes (which are advantageously produced according to integrated circuit technology) are arranged in such a way as to be able to be linked to a single point, with the size of one light pixel, thus making it possible to detect the same flashes of light.

Advantageously, the successive positive accumulation and negative accumulation states are of equal durations. Thus, if these durations are very short, so that the background noise can be assumed to be constant in two successive states, this background noise is eliminated. In effect, during the positive accumulation phase, the photosensitive element integrates the background noise and the possible synchronous flashes of light and, during the negative accumulation phase, it subtracts the background noise only, of the same strength, thus retaining only said flashes of light, whatever the strength of this background noise.

It will be noted that the switching between the negative accumulation state and the positive accumulation state may not be binary, which permits true analog time-based correlation.

Advantageously, said photosensitive elements includes a binary conversion system making it possible to determine a binary state of said photosensitive element as a function of the voltage at the terminals of the accumulation capacitor with respect to a reference voltage.

Thus it is possible, for example as a function of the duration of the accumulation states, to choose a reference voltage, corresponding to a detected light beam of determined energy, on the basis of which the photosensitive element changes binary state and thus signals a detection of flashes of light.

Moreover, said photosensitive element advantageously includes a memory storage means making it possible to record said determined binary state.

Advantageously, said photosensitive element also includes an initialization system capable of generating a determined voltage at the terminals of the accumulation capacitor.

Thus it is possible, at any moment and in particular before detection, to place the photosensitive element, at will, in one or the other of its two binary states.

The present invention also relates to a photosensitive detector which is noteworthy in that it includes photosensitive elements, in accordance with the invention, arranged in rows and columns in matrix form.

Advantageously, said photosensitive detector includes an input shift register capable of controlling all the systems for initialization of said photosensitive elements.

Thus, by means of this input shift register, all the photosensitive elements constituting said detector can be placed into either one of their two binary states.

Advantageously, said photosensitive detector also includes an output shift register capable of determining the binary state of each of the photosensitive elements of the detector that is to say to reproduce an image taken by the photosensitive detector.

Moreover, the photosensitive detector is equipped, advantageously, with a comparison system making it possible to detect any change in the binary state of a photosensitive element between a detected image and a recorded image.

Said recorded image may correspond to an image detected at a previous instant, thus making it possible, for example, to compare two successive images and to deduce either the activation of a new photosensitive element of the detector, or the end of a prior activation. Said recorded image may also be a predetermined reference image not originating from a prior detection.

Moreover, the present invention relates to various practical applications using a detector such as the one described previously.

A first application may relate to a device for locating at least one pulsed light source.

Said locating device is noteworthy, according to the invention, in that it includes a photosensitive detector in accordance with the invention, said pulsed source being localized in angle, with respect to a direction normal to the plane of said detector, by the position in said detector of the photosensitive element activated by said pulsed source.

This locating device is similar to that described in the abovementioned document FR-A-2, 583, 523, but it is enhanced by the detector in accordance with the invention, thus making it possible effectively to eliminate the background noise, especially by accumulation of numerous flashes of light.

So as to be able to locate several different pulsed sources, this locating device may be noteworthy, according to the invention, in that it is capable of decoding a signal characteristic of each of said pulsed sources, each of said characteristic signals being formed, uniquely, by a determined distribution of flashes and of absence of flashes.

A second application may relate to a rangefinder device intended to verify the presence of an object at a determined distance from said device.

To this end, said device includes:
  a laser source, capable of emitting flashes of light, and
  a photosensitive detector in accordance with the invention, capable of performing the detection of the flashes of light emitted by said source and reflected by said object, said detection being performed, at a determined instant after the emission of the flashes of light, by the switching of all the photosensitive elements of said detector into the positive accumulation state at this instant.

Thus, in order to know whether an object lies at a determined distance, detection is performed at the end of a defined time after the emission of the flashes, corresponding to the duration necessary for the light to reach an object lying at said distance and to come back to the device after reflection at this object. The actual detection or non-detection of a light signal then makes it possible to decide on the presence or otherwise of an object at this distance from the device.

Additionally, the use of a photosensitive detector in accordance with the invention makes it possible to reduce the background noise, upon this detection, by the selective accumulation of numerous successive flashes of light.

The figures of the attached drawing will give a good understanding of how the invention can be produced. In these figures, identical references designate similar elements.

FIG. 1 diagrammatically shows an embodiment example of the photosensitive element in accordance with the invention.

Figure 1:
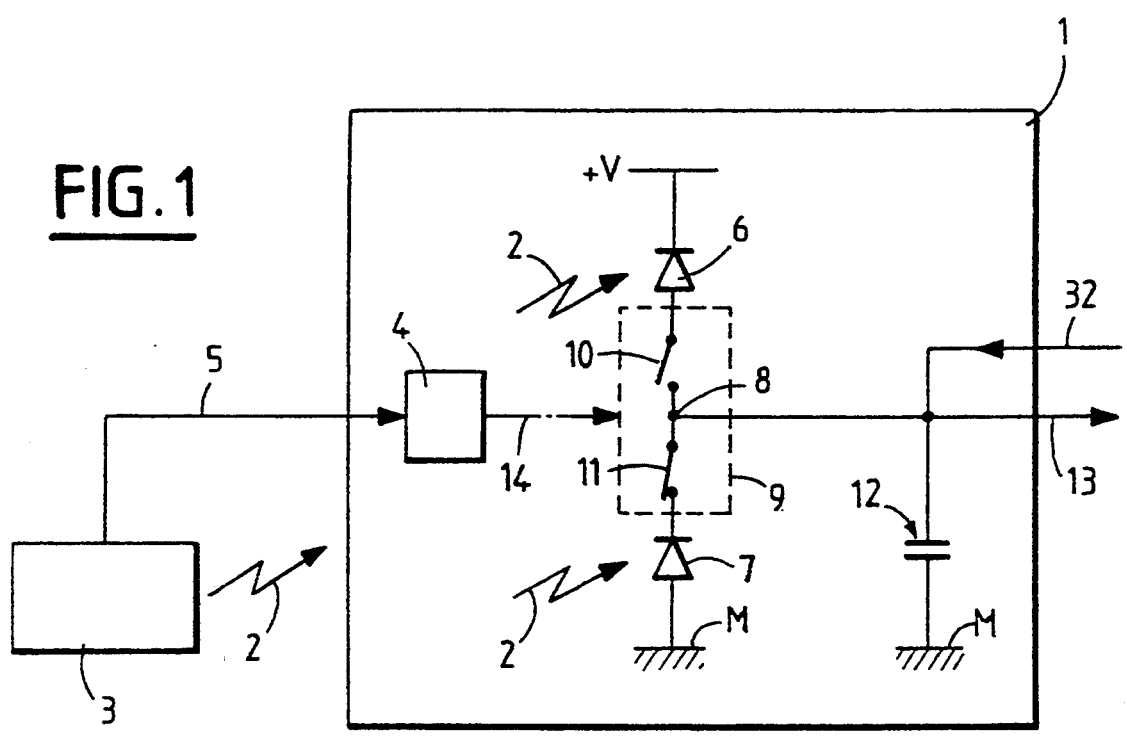

The photosensitive element 1, in accordance with the invention and represented in FIG. 1 is intended to detect flashes of light 2 emitted by a light source 3. To this end, it includes a control device 4, linked via a link 5 to the light source 3, which knows the instant of emission of said flashes of light 2.

According to the embodiment example of FIG. 1, said photosensitive element 1 includes two photosensitive diodes 6 and 7 mounted in series and having a common point 8. The cathode of one, 6, of said diodes is, moreover, linked to a positive voltage +V and the anode of the other, 7, of said diodes is linked to earth M. These photosensitive diodes 6 and 7 are capable of converting the light energy of the beams which illuminate them into electric current, and they then become conducting when they are illuminated.

The photosensitive element 1 is, moreover, equipped with a switching system 9 including two switches 10 and 11, one of which, 10, is arranged between the diode 6 and said common point 8 and the other of which, 11, is arranged between the diode 7 and this same common point 8.

Moreover, an accumulation capacitor 12 is arranged between this common point 8 and earth M. The voltage at the terminals of this accumulation capacitor 12, which is representative of the light signal detected, as will be seen below, can be measured via a link 13.

The switching system 9, which is controlled by the control device 4 via a link 14, can switch the photosensitive element 1 into two different states:
  a positive accumulation state AP, for which the switch 10 is closed and the switch 11 is open and in which the accumulation capacitor 12 is linked to the positive voltage +V via the diode 6; and
  a negative accumulation state AN, for which the switch 10 is opened and the switch 11 is closed, as represented in FIG. 1, and in which the accumulation capacitor 12 is linked solely to the diode 7.

In the positive accumulation state AP, when the diode 6 is illuminated, the accumulation capacitor 12, which is linked to the positive voltage +V, is charged by the current generated by said photosensitive diode 6.

In the negative accumulation state AN, the accumulation capacitor 12 is linked, via the photosensitive diode 7, to earth M and it is discharged by the current generated by said illuminated photosensitive diode 7.

Figure 3:
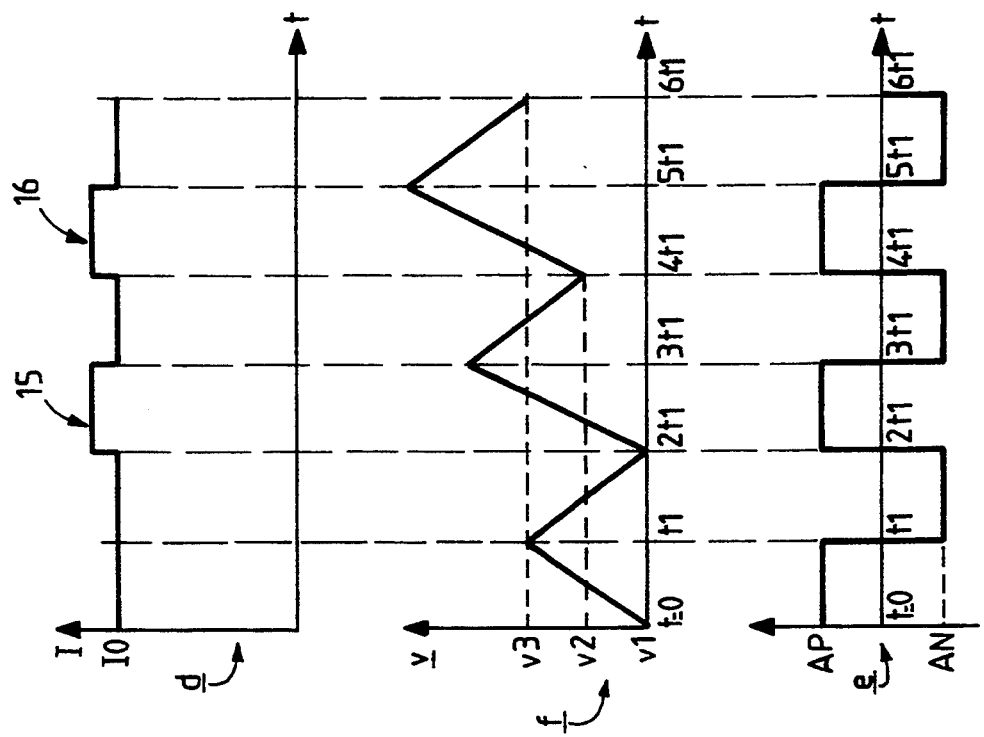
FIG. 3 illustrates the variation in the voltage at the terminals of the accumulation capacitor of a photosensitive element, for a light signal including flashes of light generated during positive accumulation states.
Figure 2:
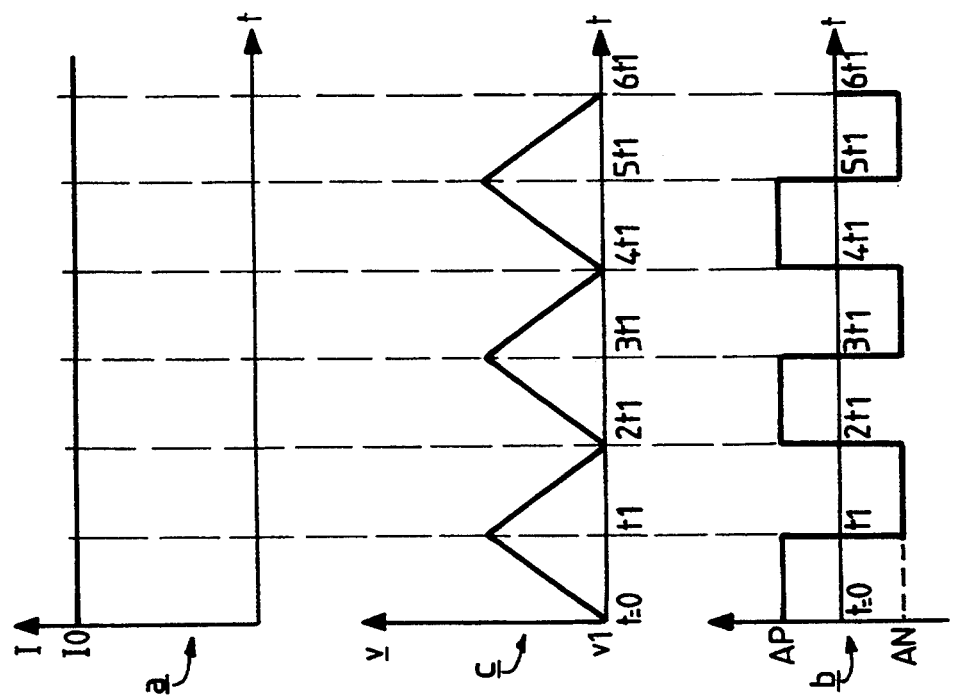
FIG. 2 illustrates the variation in the voltage at the terminals of the accumulation capacitor of a photosensitive element, for a light signal of constant intensity.

The response to a light signal by said photosensitive element 1 is explained below by referring, on the one hand, as represented in FIG. 2, to a constant light intensity forming a light background noise and, on the other hand, as represented in FIG. 3, to a light intensity additionally including flashes of light added to said background noise.

In FIG. 2, three diagrams a, b and c have been represented, including the same time base and illustrating the variation in charge of the accumulation capacitor 12, that is to say the variation in voltage at the terminal of the latter, depending on the accumulation state AP or AN, when the light illumination is continuous and constant.

Diagram a shows the variation in the light intensity I reaching the optical detector 1 as a function of time t. This light intensity is assumed constant and of value I0.

Diagram b shows the different successive positive accumulation AP and negative accumulation An states, each of these states exhibiting the same duration t1.

For its part, diagram c illustrates the voltage v at the terminals of the accumulation capacitor 12, that is to say the useful signal reproduced by the photosensitive element 1. Thus, by virtue of the periodicity of the successive switchings, the signal integrated during the positive acumulation phase AP is subtracted, in every instance, in the negative accumulation phase AN, the voltage v, at the various times 2nt1 (where n is an integer) thus having the same value v1 as at the time t=0.

This makes it possible to eliminate the background noise when the latter is constant over the duration of a positive accumulation and of the following negative accumulation.

The voltage v1 is, in principle, zero, but in certain applications it is possible to allocate it a nonzero value, as will be seen below.

In FIG. 3, three diagrams d, e and f have been represented, identical to the diagrams a, b and c of FIG. 2, but in the case in which, in addition to a light background noise of constant intensity I0, the photosensitive element 1 is illuminated by flashes of light 2, the contribution of these flashes 2 in the intensity I being represented by the plateaux 15 and 16 in diagram d.

The control system 4, which knows the instant of the emission of the flashes of light 2, via the link 5 or by any other means (not represented), switches the photosensitive element 1, at each emission of a flash of light 2, into the positive accumulation state AP, as represented by the diagrams d and e of FIG. 3.

Said link 5 between the control system 4 and the light source 3 may be a physical link, for example in the form of an electrical line, or a radio or optical link. The control system 4 and the source 3 may also be linked to respective, time-matched clocks.

Thus, in the situation of FIG. 3, the electric current generated by the background noise, which charges the accumulation capacitor during the positive accumulation state AP, discharges it during the negative accumulation state AN, making it possible to cancel out this background noise as in the example of FIG. 2.

In contrast, by virtue of the synchronization of the positive accumulation state AP with the emission of the flashes of light 2, the light intensity originating from said flashes of light is integrated only during the positive accumulation phase AP, and it is not subtracted during the negative accumulation phase AN. Thus, the voltage X at the terminals of the accumulation capacitor 12 increases in the course of the time t as a function of the intensity and of the number of said integrated flashes of light 2. The integration of the plateau 15 entails an increase in the voltage v from v1 to v2 and the integration of the plateau 16 an increase in the voltage M from v2 to v3.

Figure 4:
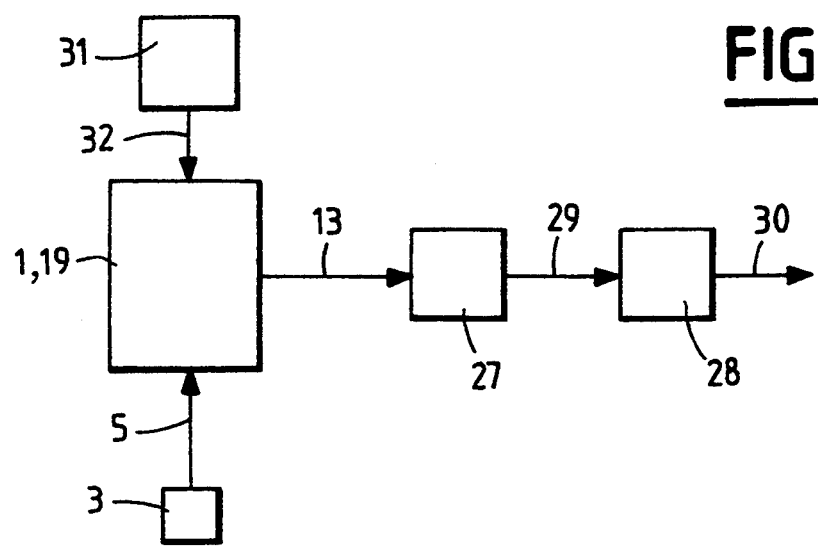
FIG. 4 shows, diagrammatically, the links between a photosensitive element and devices associated with said photosensitive element.

Said photosensitive element 1 is linked by the link 13 to a binary conversion system 27, as represented in FIG. 4.

This binary conversion system 27 compares the voltage M at the terminals of the accumulation capacitor 12 with a reference voltage vo and, depending on the result, assigns a binary state 0 (if v is lower than vo) or 1 (if v is higher than vo) to said photosensitive element 1. This binary state can be recorded by a memory-storage means 28 linked to said binary conversion 27 by a link 29. Said memory-storage means 28 can transmit the recorded result via a link 30.

Moreover, an initialization system 31 linked to said photosensitive element 1 by a link 32 makes it possible to precharge the accumulation capacitor 12, that is to say that it is capable of giving a defined value to the initial voltage v1 measured at the terminals of the accumulation capacitor 12.

This initialization system 31 makes it possible, in particular, to generate a voltage v1 which is higher than the reference voltage vo, so that the photosensitive element is in the 1 state before the detection.

Figure 5:
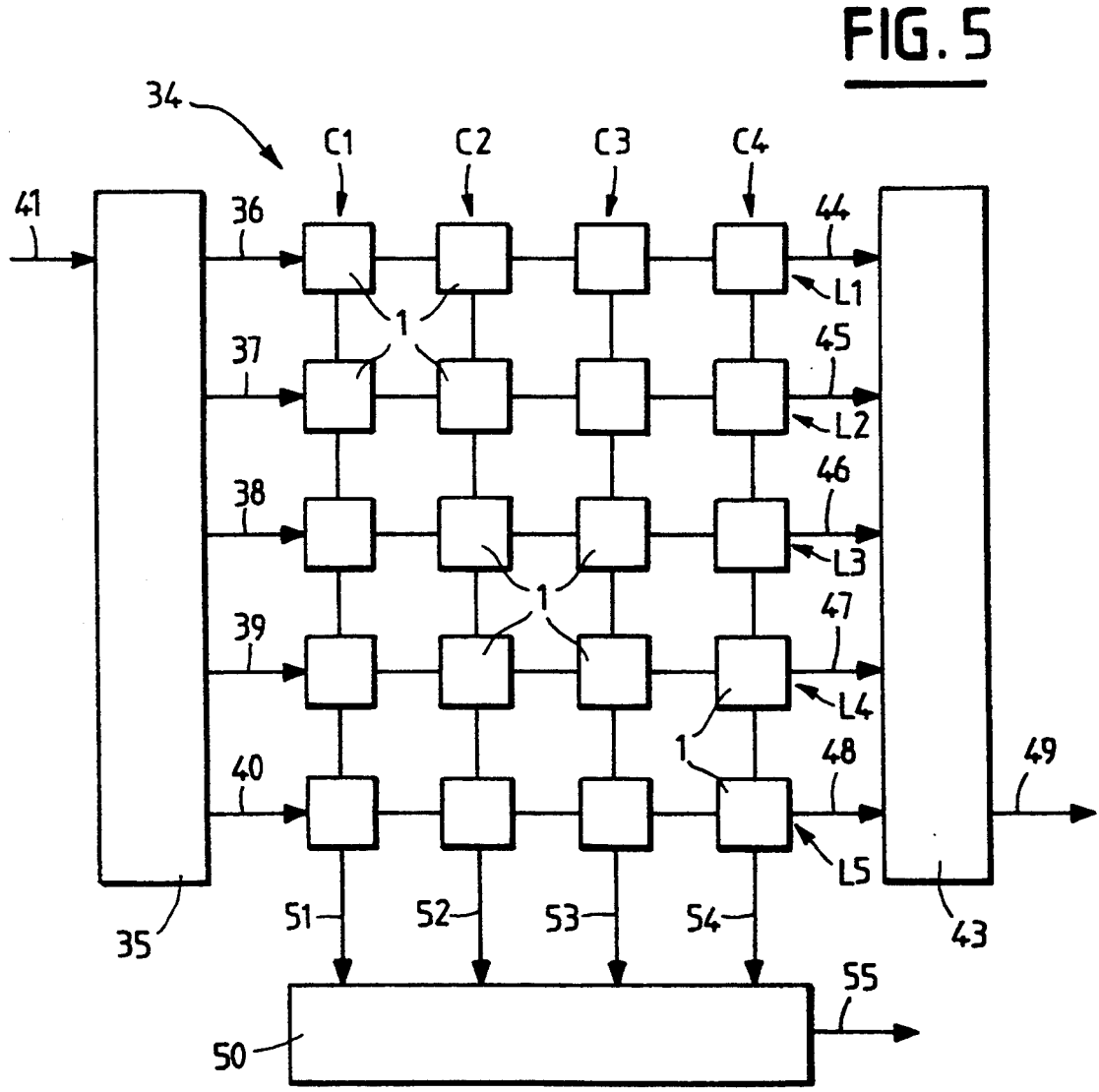
FIG. 5 illustrates a photosensitive detector including photosensitive elements arranged in rows and columns in matrix form.

The present invention also relates to a photosensitive detector 34, as represented in FIG. 5, including photosensitive elements 1 arranged in matrix form.

Said photosensitive elements 1 are linked together in rows L1, L2, L3, L4, L5 and in columns C1, C2, C3, C4.

Said detector 34 includes an input shift register 35, linked to the rows L1, L2, L3, L4 and L5 by links 36, 37, 38, 39 and 40, and making it possible to control the system 31 for initialization of each of the photosensitive elements 1 of the detector 34 from one input 41. Thus, before detection, each of the photosensitive elements 1 can be set, at will, into one or its binary states, 0 or 1.

Said detector 34 also includes an output shift register 43, linked to the rows L1, L2, L3, L4 and L5 by links 44, 45, 46, 47 and 48, and making it possible to communicate, by an output 49, row by row, the binary state of each of the photosensitive elements 1. Consequently, it makes it possible to reproduce an image taken by the photosensitive detector 34. This image reproduction operation can be performed, simultaneously, with a further image taking, that is to say with a further integration of light signals.

Moreover, a comparison system 50, linked to the columns C1, C2, C3 and C4 of the photosensitive detector 34 by links 51, 52, 53 and 54, makes it possible to detect, and to communicate by an output 55, any change in the binary state of one of the photosensitive elements 1 between a detected image and a recorded image. This comparison system 50 thus performs a global-OR function, common to all the photosensitive elements of the detector. This recorded image may be a previously detected image or a prerecorded reference image.

The photosensitive detector represented in FIG. 5 may be used in numerous optoelectronic devices, in particular in devices for monitoring and locating light sources. By way of example, a few possible applications of this photosensitive detector are described below.

Figure 6:
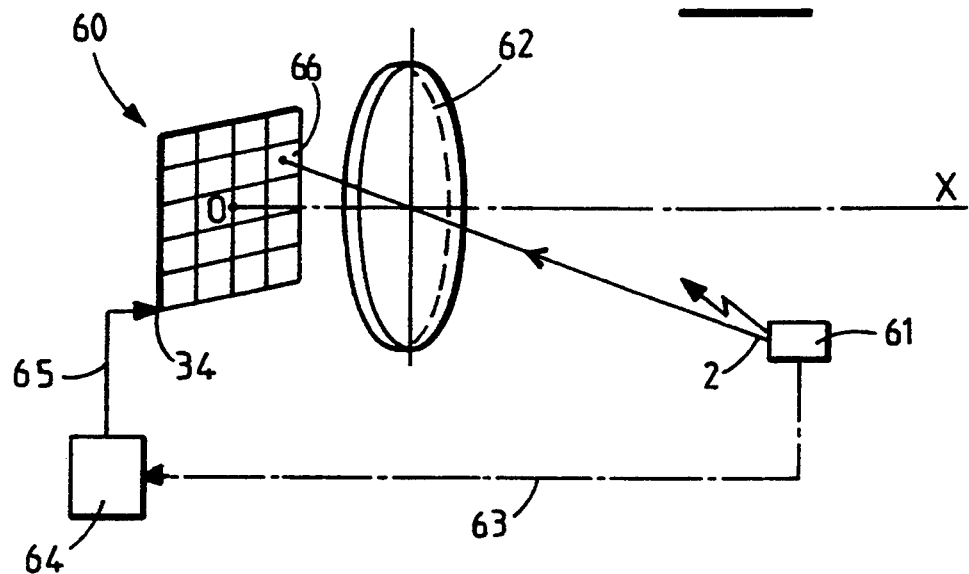
FIG. 6 shows, diagrammatically, a device for locating a mobile pulsed light source.

A first possible application relates to a device 60 for locating a mobile pulsed light source 61, as represented in FIG. 6, which makes it possible, with respect to an axis OX, to determine the angular position of said light source 61.

Said device 60 includes optics 62, observing the environment of the axis OX in which the source 61 lies, and a photosensitive detector 34, with which a control unit 64 is associated, knowing, via a link 63 or by any other means, the instant of emission of the flashes of light 2 from the source 61 and capable of transmitting this information to the control devices (not represented) of the various photosensitive elements of the detector 34 via a link 65. Said emitted flashes of light 2 activate a photosensitive element 66. The position of the light source 61 is then determined as a function of the position of this activated photosensitive element 66 in the detector 34.

Said locating device 60 can detect several mobile pulsed sources (not represented). To do that, it is sufficient for each pulsed light source to periodically emit a coded sequence in a unique way by a predetermined distribution of flashes and of absence of flashes.

Each sequence starts off with a flash, preceded by a mandatory absence of a flash making it possible to reset a decoding time base, after the fashion of so-called "synchronous" data transmission bit trains, and to concatenate by a defined succession of positive accumulation states, when a flash is anticipated, and of negative accumulation states. In each sequence, the number of flashes is chosen in such a way that they must all be detected so that the voltage at the terminals of a photosensitive element exceeds the reference voltage vo, thus conferring great selectivity on the device.

Figure 7:
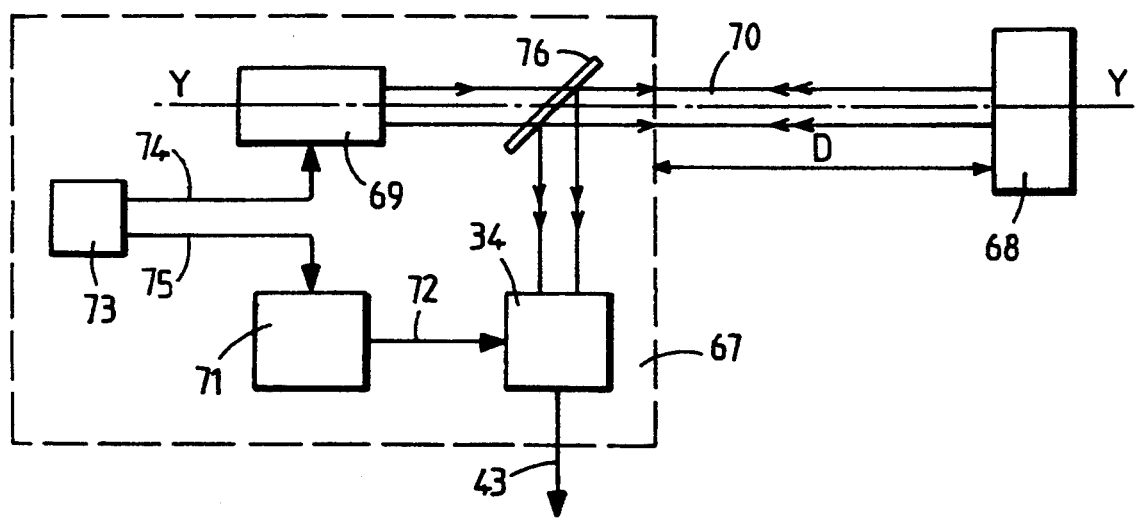
FIG. 7 illustrates, diagrammatically, a range finder device.

A second possible application of the photosensitive detector in accordance with the invention relates to a range finder device 67, as represented in FIG. 7. Said range finder device 67 makes it possible to verify the presence of an object 68 at a determined distance D from said device.

To this end it includes:
- a laser source 69, capable of emitting laser flashes 70, with axis Y—Y;
- a photosensitive detector 34 in accordance with the invention;
- a semi-transparent mirror 76 capable of sending, onto the photosensitive detector 34, the laser flashes 70 emitted by the laser source and reflected by said object 68;
- a time base 71 linked to the photosensitive detector 34 by a link 72; and
- a triggering element 73 capable of triggering the laser source 69 by a link 74 and of simultaneously activating the time base 71 by a link 75.

When a laser emission is triggered, the time base 71 is activated. At the end of a time t corresponding to the duration necessary for an emitted laser pulse to reach an object lying at the distance D and to come back to the device after reflection at this object, the time base 71 activates said photosensitive detector 34, which then performs an image-taking by switching all the photosensitive elements into the positive accumulation state. The detection or otherwise of a laser flash then makes it possible to determine the presence or otherwise of an object at the distance D from the device. In the event of detection of a laser flash, the position in the detector of the photosensitive element activated by said laser flash makes it possible to locate said object, as for the above-mentioned locating device 60.

Moreover, said range finder device 67 makes it possible, in accordance with the invention, to eliminate the background noise during this detection, by virtue of equal successive positive accumulation and negative accumulation durations.

Although, in FIG. 1, the switches 10 and 11 have been represented diagrammatically in the form of moving contacts, it goes without saying that the switching system 9 may be of the static type.

We claim:

1. A photosensitive element (1) for detecting flashes of light (2), including an accumulation capacitor (12), a photosensitive diode (6, 7) capable of converting the light energy into electric current, and a control device (4) knowing the instant of the emission of the flashes of light (2) and capable of switching said photosensitive element into one or the other of two different states:
   - a positive accumulation state (AP), activated at least over the duration of emission of the flashes of light (2), in which state the accumulation capacitor (12) is charged by the electric current generated by the light energy reaching said photosensitive element (1); and
   - a negative accumulation state (AN), in which the accumulation capacitor (12) is discharged by the electric current generated by the light energy reaching said photosensitive element (1), which includes a second photosensitive diode and a switching system (9), controlled by said control device (4) and capable of linking the accumulation capacitor (12), on the one hand, to one (6) of said photosensitive diodes in the positive accumulation state (AP) and, on the other hand, to the other (7) of said photosensitive diodes in the negative accumulation state (AN).

2. The photosensitive element (1) as claimed in claim 1, wherein the successive positive accumulation (AP) and negative accumulation (AN) states are of equal duration.

3. The photosensitive element (1) as claimed in claim 1, which includes a binary conversion system (27) making it possible to determine a binary state of said photosensitive element (1) as a function of the voltage (v) at the terminals of the accumulation capacitor (12) with respect to a reference voltage (vo).

4. The photosensitive element (1) as claimed in claim 3, which includes a memory-storage means (28) making it possible to record said determined binary state.

5. The photosensitive element (1) as claimed in claim 1, which includes an initialization system (31) capable of generating a determined voltage (v1) at the terminals of the accumulation capacitor (12).

6. A photosensitive detector (34), which includes photosensitive elements (1), as claimed in claim 1, arranged in rows (L1, L2, L3, L4, L5) and columns (C1, C2, C3, C4) in matrix form.

7. The photosensitive detector (34) as claimed in claim 6, including photosensitive elements (1) which includes an input shift register (35) capable of controlling all the systems (31) for initialization of said photosensitive elements (1).

8. The photosensitive detector (34) as claimed in claim 6, which includes an output shift register (43) capable of transmitting the binary state of each of the photosensitive elements (1) of the detector, that is to say to reproduce an image taken by the photosensitive detector (34).

9. The photosensitive detector (34) as claimed in claim 8, which includes a comparison system (50) making it possible to detect any change in the binary state of a photosensitive element between a detected image and a recorded image.

10. A device (60) for locating at least one pulsed light source (61), which device includes a photosensitive detector (34) as claimed in claim 6, said pulsed source (61) being located, with respect to a direction (OX) normal to the plane of said detector, by the position in said detector (34) of a photosensitive element (66) activated by said pulsed source (61).

11. The device for locating several pulsed light sources, as claimed in claim 10, which is capable of decoding a signal characteristic of each of said pulsed sources, each of said signals being formed, uniquely, by a defined distribution of flashes and of absence of flashes.

12. A range finder device (67) intended to determine the presence of an object (68) at a determined range (D) from said device, which includes:
- a laser source (69), capable of emitting flashes of light (70), and
- a photosensitive detector as claimed in claim 6, capable of performing the detection of the flashes of light emitted by said source and reflected by said object, said detection being performed, at a determined instant after the emission of the flashes of light, by the switching of all the photosensitive elements of said detector into the positive accumulation state at this instant.

* * * * *

UNITED STATES PATENT AND TRADEMARK OFFICE
CERTIFICATE OF CORRECTION

PATENT NO. : 5,430,290
DATED : Jul. 4, 1995
INVENTOR(S) : Merle et al.

It is certified that error appears in the above-identified patent and that said Letters Patent is hereby corrected as shown below:

On the title page, under

[73] Assignee: delete "Societe Nationale Industrielle et Aerospatiale" and insert --Aerospatiale Societe Nationale Industrielle--

Signed and Sealed this

Twenty-second Day of August, 1995

Attest:

BRUCE LEHMAN

*Attesting Officer*    *Commissioner of Patents and Trademarks*